Dec. 4, 1951     A. L. HITCHENS ET AL     2,577,123

METHOD OF WELDING A BUNDLE OF ALUMINUM TUBES

Filed Oct. 16, 1946

INVENTORS
Aaron L. Hitchens
BY Frederick G. Stroke
Austin, Wilhelm & Carlson
ATTORNEYS.

Patented Dec. 4, 1951

2,577,123

UNITED STATES PATENT OFFICE 2,577,123

METHOD OF WELDING A BUNDLE OF ALUMINUM TUBES

Aaron L. Hitchens, New Haven, Conn., and Frederick G. Stroke, Temple, Pa., assignors to Olin Industries, Inc., New Haven, Conn., a corporation of Delaware Application October 16, 1946, Serial No. 703,558

3 Claims. (Cl. 113—112)

This invention relates to metal bonding and, more especially, to bonding an assembly of metal parts having abutting surfaces, as exemplified particularly by the bonding of the ends of thin-walled metal tubes for cartridge core type heat exchangers.

Cartridge type heat exchangers have heretofore usually been made of copper or copper alloy with their tube ends bonded by either hard or soft solder. Copper base heat exchangers have certain disadvantages, among which are comparatively heavy weight and catalytic action on the oil when used for oil coolers. Aluminum heat exchangers overcome these disadvantages but heretofore have had disadvantages of their own in that their tube ends have been difficult to bond. Bonding by aluminum brazing alloy is difficult because its melting point is so close to the fusing temperature of the aluminum tubes and because of the difficulty of removing entrapped brazing flux. Furthermore, the product itself is not entirely satisfactory since it is prone to fail under high pressures and vibration.

The present invention provides an improved method of bonding a multitudinous assembly of metal parts whereby the edge portions of contacting members are pressed simultaneously against a welding surface and progressively fused together. Applied to the manufacture of cartridge core type heat exchangers containing aluminum tubes, this results in a novel advantageous unit wherein the tube ends are autogenously welded forming in effect cast headers integrally connected by wrought tube bodies.

In accordance with this invention, generally stated, a plurality of parts, made of the same metal and having contacting surfaces, are fitted together in the desired relationship, and an edge face of the assembly is then pressed against a suitable heated surface until the end portions of the contacting members are melted to an extent such that on subsequent solidification of the molten metal, a tight jointure of the parts results.

According to a preferred method of practicing the invention, a group of aluminum tubes having enlarged hexed ends are fitted together forming a core, with the respective tube ends in register in parallel planes. The core is surrounded by end caps or a shell and a temporary clamping device clamps the resulting tube bundle. After preheating, the tube bundle is placed, tube ends down, upon a suitable heated welding plate having a horizontal plane surface to which a flux layer has previously been applied. Pressure is applied to such tube bundle and the end portions of the tubes are melted, the molten aluminum coalescing and bonding the tube ends together and to the end cap or shell, forming, in effect, a cast header.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Figure 1:
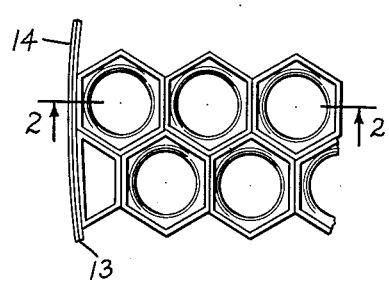
Fig. 1 is a detail of a group of packed tubes, prior to the bonding operation.
Figure 3:
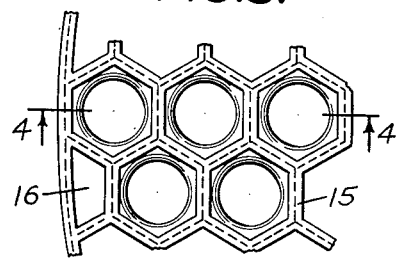
Fig. 3 is a view similar to Fig. 1 but illustrating somewhat diagrammatically the appearance of the end of the core after the bonding operation.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Figs. 1 to 4, the wrought aluminum tubes, which may be either drawn or extruded by processes well known in the art and consist of commercially pure aluminum or alloys predominantly of aluminum, have bodies 10 with enlarged hexed ends 11 stacked together in a well-known manner, the enlarged ends 11 spacing the bodies 10 apart to provide space between the tubes for the flow of one of the fluids between which heat is interchanged, usually liquid. The other fluid, usually air, passes lengthwise through the interior of the tubes.

Surrounding the core of tubes is shell 12, comprising a relatively heavy body 13 and having a margin 14 reduced to a thickness comparing with the thickness of the tubes which may be of the order of .006 inch. The thin margin 14 is bent to fit the uneven or corrugated outer surface of the tube core prior to the bonding operation. Tubes having enlarged ends 16 of irregular shape may be interposed between the regular tubes and in the shell to conform with the contour of the shell as is well understood in the art.

It will be understood that suitable conduits (not shown) may connect with the body 13 of the shell 12 for the supply and withdrawal of the fluid passing around the outside of the tubes.

Figure 2:
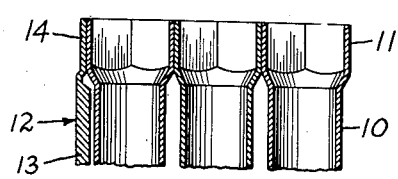
Fig. 2 is a section on the line 2—2 of Fig. 1.

The tubes before bonding will be in the form illustrated in Figs. 1 and 2. The bonding process, according to the invention, autogenously welds the enlarged tube ends together and to the shell 12, producing a locally cast beaded network, indicated by 15, which in effect forms a locally cast header. The two ends of the tube bundle are similarly bonded, forming, in effect, two headers of cast aluminum integrally connected by tube bodies of wrought aluminum. The method of bonding will be described hereinafter in more detail.

Figure 5:
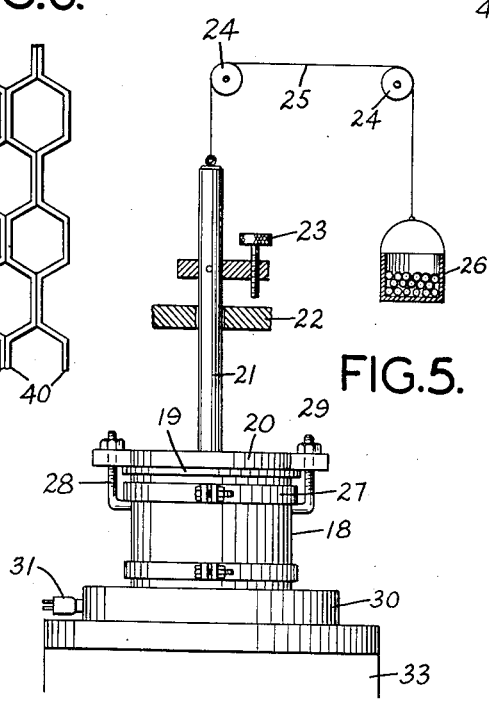
Fig. 5 illustrates diagrammatically apparatus for carrying out the bonding method according to the invention.

Referring now to Fig. 5, there is shown, diagrammatically, one form of apparatus by which the invention may be practiced. This apparatus includes a counterbalancing device in the form of a bucket of shot 26, counterbalancing the bundle of tubes indicated generally by 18. This apparatus includes a steel holding plate 20 having a plunger 21 integrally secured thereto and vertically slidable within a stationary guide 22. An adjustable stop screw 23 is threaded into a stop secured to the plunger 21 and is adapted to contact stationary guide 22 to limit the length of tubes, which is melted, as explained hereinafter. A line 25 passing over pulleys 24 connects plunger 21 and bucket 26.

The holder for the tube bundle 18 will vary with the shape of the core, the number of tubes, and the type of shell. In the form shown for purposes of illustration, the holder comprises two ring clamps 27 surrounding shell 12 tightly clamping the tubes together and to the shell. Hooks 28 pass through the plate 20 and engage under the upper clamp 27. A heat insulating plate 19 is interposed between the tube ends and the plate 20.

The tube ends are welded together and to shell 12 by placing the bundle 18 comprising the core of tubes surrounded by the shell against a welding plate or block 30. This welding plate may be a graphite block of quality known as graphite CS-3 manufactured by the Union Carbide & Carbon Company. It is dense and has high heat conductivity. Its horizontal plane working face is machined and finished into a smooth horizontal plane surface. The block is disposed within a gas-fired pot furnace 33 and its temperature is pyrometrically controlled, the pyrometer connection being indicated by 31.

The welding plate 30 may, of course, be made from other materials that will stand up under the temperature and chemical action of the welding as, for example, nickel or nickel alloys. The plate or block may also be heated electrically, as by inductance or resistance means, or in a bath of molten lead.

One manner of using the above apparatus to carry out the preferred method is as follows:

The bundle 18 of tubes and shell is first assembled and clamped together by clamps 27. The bundle is then temporarily secured to the supporting plate 20 for certain preliminary adjustments, i. e. obtaining proper counterbalance, proper welding weight, and proper set screw setting.

The bundle 18 is secured under the supporting plate 20 with the hooks 28 clamping the core up against the plate 20 with heat insulation 19 interposed. Shot is added to container 26, or removed therefrom, exactly to counterbalance the system. The bundle is then placed upon the welding plate 30 and the screw 23 adjusted to the proper spacing from guide 22 to control the desired amount of tube melting. This is the position shown in Fig. 5.

With the system exactly counterbalanced, proper weight (not shown) is placed upon the top of plate 20 to exert the desired downward pressure on the bundle to control the welding action. The optimum weight can readily be determined by experiment for each article to be welded. In practice, it has been found that a weight approximately equal to the weight of the bundle itself acts satisfactorily for the shapes and sizes with which tests have been conducted.

The bundle assembly is then removed from the holder plate 20, preferably with the clamps 27 still in place on the bundle. The bundle is then thoroughly cleaned in any desired manner to remove all foreign matter, such as aluminum oxide, dirt and scale, to expose the pure metal for the welding operation.

A preferred cleaning operation includes immersing the bundle for a period of from 10 to 30 seconds in a warm 10% sodium hydroxide solution. This is followed by a rinse in pure water, after which the bundle is immersed in a warm 10% nitric acid solution for a period of from 1 to 2 minutes. The bundle is then thoroughly rinsed in warm water.

The bundle assembly is then placed in a preheating oven. Preheating the bundle to a temperature of 950° F. before welding produces good results with the aluminum base compositions given below. The preheating temperature is not especially critical except that it should be high enough to promote welding without requiring the bundle to engage the hot plate for too much time, and should be low enough to avoid undue oxidation of the aluminum. A ten minute preheating period has been found to be satisfactory but this again will depend upon the size and conditions.

In the meantime, the welding plate or block 30 is heated to proper temperature, scraped clean, and the welding flux powder (specified below) is added to the surface thereof. Generally, a slight excess of flux is added to insure forming a molten layer about $\frac{3}{32}$ inch deep over the surface of block 30, the surplus overflowing at the edges.

The bundle assembly is remounted under plate 20 with the insulation layer 19 interposed and the apparatus is ready for the welding operation. The bundle is placed upon the welding plate 30, the added welding weight causing the otherwise counterbalanced system to feed the bundle downwardly as the tube ends melt until the adjustable stop screw 23 engages guide 22.

The time of welding is the time required for the limit stop 23 to travel its full displacement to position against guide 22. This is dependent upon the several variables and has been found to vary from 3½ to 120 seconds. A displacement of 1/16 of an inch has been found to give satisfactory results. This, of course, means that the tube ends melt a distance of 1/16 of an inch to form the beaded network indicated by 15 in Fig. 4.

The powder flux melts in a thin layer on the plane horizontal surface of the welding plate. The molten flux wets the tube ends and aluminum melting follows shortly thereafter, the melting being accomplished, both by heat from the flux and by heat from the welding plate. The molten aluminum flows, through capillary attraction, upwardly between the enlarged tube ends, filling the cracks and crannies between the tube ends themselves and between the tube ends and the shell, including the corners of the hexed ends, forming a local casting extending homogeneously throughout the entire end face of the bundle and forming in effect a cast header.

As soon as the limit stop 23 engages guide 22, the welding operation is completed. The core is removed from the welding plate and scraped to remove all surface flux. The position of the core is then reversed in the holder plate 20 and the welding operation is repeated by engaging the other ends of the tubes against the welding block and using the limit stops in the same manner as described above for welding the first end face. After welding the second end face, the core is thoroughly washed to remove all flux.

Before each welding operation, it is necessary to scrape residual, partly decomposed flux from the surface of the welding block, and add fresh flux. This tends to promote rapid wetting and heating of the metal parts to be welded and is an important factor in providing reproducible results.

The invention may be applied to the welding of parts made of the same metal, for example, of copper, brass, magnesium, or zinc, but it is particularly applicable to welding parts of aluminum or aluminum alloys, with respect to which the following specific examples as to composition and temperatures are given.

Articles of aluminum or aluminum alloys have been successfully welded by the described process at welding block temperatures ranging from about 1400 to 1500° F., the period of the welding operation varying according to the temperature and the extent of the weld from about 3½ to 120 seconds. Excellent results are obtainable in welding commercially pure aluminum using a welding block temperature in the range of 1475 to 1500° F., the welding period extending for 15 to 30 seconds.

Excellent results were obtained using an aluminum alloy manufactured by the Aluminum Company of America and known as XJ–51–S. This alloy has a composition of 0.25% copper, 0.6% magnesium, 0.35% silicon, balance aluminum. This composition has a melting temperature range of from approximately 1140 to 1210° F. Optimum welding temperature for the carbon block with this alloy was found to be from 1450 to 1475° F., the welding period extending from 15 to 30 seconds.

Another aluminum alloy giving good results under test, and manufactured by the Aluminum Company of America, is known as alloy 61–S. This has a composition of 0.25% chromium, 0.25% copper, 1.0% magnesium, 0.6% silicon, balance being aluminum. This composition has a melting temperature range of from 1115 to 1210° F. Optimum welding temperature for the carbon block with this alloy was found to be between 1425 to 1450° F., the welding period extending from 15 to 30 seconds.

A suitable flux for use in welding the above compositions was found to be a flux manufactured by the Aluminum Company of America, known as Alcoa brazing flux No. 53. This was found to have an approximate composition of 34.7% potassium chloride, 49.0% sodium chloride, 8.2% cryolite, 1.0% strontium chloride, 1.0% sodium fluoride, 6.1% moisture, and a trace of lithium by spectroscopic analysis.

Thus a heat exchanger and a method of bonding are provided which have many advantages. The shell and core of aluminum tubes are firmly and securely bonded, forming an integral unit, wherein the cast headers formed by the autogenous welding of the two ends are integrally connected by wrought tube bodies. The disadvantages of bonding by aluminum brazing alloy are avoided. The heat exchanger of this invention is far stronger, and can operate without failure under higher pressures, than heat exchangers made by brazing or soldering methods.

Test sections through the tube ends of completed heat exchangers, and photomicrographs of said sections, indicate a cast metal structure in the welded ends having relatively much larger grains than the wrought metal in the body of the tubes. The beaded network formed by the autogenous welding adds body to the headers without materially interfering with the fluid flow through the inside of the tubes. The force applied to the core, pressing it against the welding plate, helps to control the flow of the melting aluminum, tending to prevent the formation of pinholes when the molten metal solidifies. The beaded network which bonds the plates together is formed from the metal of the tubes and shell and does not require the addition of special welding metal. The process does not trap flux within the walls and does not burn the metal. The use of the shell of the same composition as that of the tubes prevents electrolytic corrosion when the heat exchanger is in use. The aluminum heat exchanger being lighter, and the absence of any catalytic action, makes it superior to the conventional copper heat exchanger for use in places where these factors are significant, such as in airplane oil coolers.

This invention is likewise applicable with advantage to the fabrication of heat exchangers of the corrugated ribbon type as shown, for example, in Fedders Patent No. 1,368,220, dated February 8, 1921, or in Briskin Patent No. 1,730,719, dated October 8, 1929.

Figure 6:
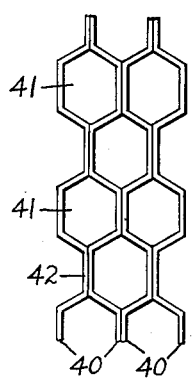
Fig. 6 is a fragmentary end view of a ribbon type heat exchanger which may be bonded by the process of the invention.

Referring to Fig. 6, a fragmentary end view of a single section from such a type of heat exchanger is diagrammatically shown, the reference character 40 indicating the edges of a series of ribbon members suitably corrugated. The corrugations are such that when the ribbons are placed in contact in the manner illustrated, a series of hexagonal openings 41 are provided. To practice the invention for the purpose of welding such a section, either by itself, or when assembled with similar sections, the ribbons are placed in proper relationship with respect to each other. They are then clamped together to form a bundle and the entire bundle placed against the welding plate in a manner similar to that described above. This action melts the edge portions of the ribbons, those portions in contact, indicated by 42, being autogenously welded together.

Figure 7:
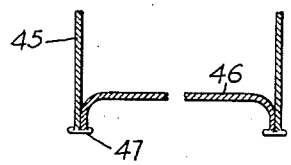
Fig. 7 is a fragmentary section illustrating somewhat diagrammatically one type of metal container, after welding by the method of the invention.

As a further illustration of the applicability of the improved bonding process, this welding method is also adapted to the manufacture of metal containers. Referring to Fig. 7, the end of one such container is shown. This container comprises a suitable outer wall 45, which may be circular or square or other shape in cross section, and in which is inserted an end cap 46 consisting of a dished plate. The margins of the sheets forming the side wall and end cap are closely pressed together by making the end cap fit tightly within the side wall. Bonding is accomplished by pressing the assembly against the flux-covered welding surface, forming the welded bead indicated by 47.

Figure 8:
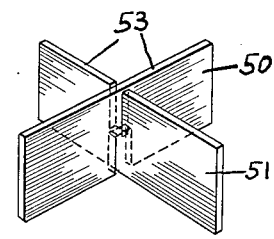
Fig. 8 illustrates a type of intersecting partition to which the invention may be applied.

The invention is also applicable to connecting metal partitions at their points of intersection. Referring to Fig. 8, for example, two partition members 50, 51 are indicated, each having a slot, the slots being interlocked, as indicated. These partition members may cross at different angles. When the edges 53 of these members are placed against the flux-covered welding plate in the manner discussed above, the edges are similarly melted, producing beads along the edges of the partition walls, such beads fusing together at the wall intersections forming, in effect, spot welds at these points. The welding is omitted for simplicity of illustration.

The invention is applicable to welding sheet metal of different thicknesses. For example, in the case of heat exchangers, the gauge of the metal tubes may be of the order of .006 inch or less. Good results have been obtained in welding tubes of such thickness to each other and to the thinned margins of the heat exchanger shell which may be of the same thickness as the tube walls. Good results have also been obtained without thinning the shell margin and welding tubes of .006 inch in thickness directly to the heavier shell which may be of the order of $\frac{1}{16}$ of an inch in thickness.

The invention is also applicable to welding sheets of somewhat heavier gauge. For example, good results have been obtained by welding together two sheets of $\frac{1}{16}$ of an inch thickness each. It is obvious that metal members of still greater thickness may be welded, for example, of a thickness such as found in relatively heavy structural members.

Figure 4:
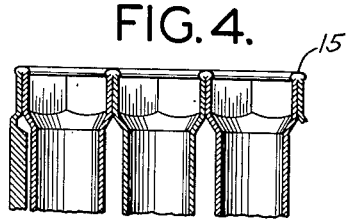
Fig. 4 is a section on the line 4—4 of Fig. 3.

The amount of metal in the welding bead may be controlled by the extent to which the fusion of the end portions of the contacting surfaces is allowed to proceed. The bead shape may be controlled somewhat by the pressure applied, during welding, to the work against the welding plate. For heat exchangers, for example, it may be desirable to form the beads with a somewhat circular or rounded cross section as indicated in Fig. 4 so as to have minimum interference with the air flow through the tubes. On the other hand, in other cases the bead may be flattened or spread out as indicated in Fig. 7 either to provide increased strength or to give improved appearance.

It will be noted that the invention lends itself to the mass production of welds in that scores, hundreds and thousands of heat exchanger tubes or other members may be welded simultaneously in one operation. An advantage of such a system will be apparent from consideration of the fact that a comparatively small heat exchanger may have, for example, as many as sixty tubes on a side, making a total of some thirty-six hundred tubes. It is obvious that the area of the welding plate and the number of pieces that can be simultaneously welded is almost unlimited, and that regardless of number, uniform welding is assured. Not only are the several tubes in a single welding operation uniformly welded, but the welding conditions can be successfully reproduced from one welding operation to another.

It will be noted that in all cases the members to be welded are arranged, during welding, with their adjoining margins or edges in either direct or close contact with each other, and with their adjacent (but non-contacting) edges directly abutting the welding plate. This provides more uniform heat to all parts of the welding area and facilitates the welding operation.

In the claims the term aluminum is intended to cover tubes made of commercially pure aluminum, as well as alloys predominantly aluminum.

While certain novel features of the invention have been disclosed herein, and are pointed out in the annexed claims, it will be understood that various omissions, substitutions and changes may be made by those skilled in the art without departing from the spirit of the invention.

What is claimed is:

1. The method of bonding a bundle of aluminum tubes having prehexed expanded ends, said method comprising heating a welding member having a plane horizontal welding surface to welding temperature, covering said welding surface with flux, bringing together the tube bundle and heated, flux-covered welding surface by a feeding movement to engage the edges of the tube ends with the flux and welding surface, thereby to selectively melt the tube ends without melting the tube bodies, stopping the feeding movement after a predetermined amount of the tube ends has been melted, and separating the tube bundle and welding member whereby the resulting molten metal autogenously casts the ends of the tubes together.

2. The method of bonding a bundle of aluminum tubes having prehexed expanded ends, said method comprising preheating the tubes to an elevated temperature less than welding temperature, applying heat to a welding member having a plane horizontal welding surface at a point removed from said welding surface to raise said welding surface to welding temperature, covering said welding surface with flux to melt the flux, bringing together the preheated tube bundle and the heated, flux-covered welding surface by a feeding movement to engage the edges of the tube ends with the molten flux and welding surface, thereby to selectively melt the tube ends without melting the tube bodies, stopping the feeding movement after a predetermined amount of the tube ends has been melted, and separating the tube bundle and welding member immediately thereafter, whereby the resulting molten metal autogenously casts the ends of the tubes together.

3. The method of bonding a bundle of aluminum tubes, said method comprising heating a welding member having a welding surface to welding temperature, covering said welding surface with flux, bringing together the tube bundle and welding surface to engage the edges of the tube ends with the flux and welding surface, thereby to selectively melt the tube ends without melting the tube bodies, stopping the feeding movement after a predetermined amount of the tube ends has been melted, and separating the tube bundle and welding member, whereby the resulting molten metal autogenously casts the ends of the tubes together.

AARON L. HITCHENS.
FREDERICK G. STROKE.

REFERENCES CITED

The following references are of record in the file of this patent:

UNITED STATES PATENTS

| Number | Name | Date |
|---|---|---|
| 1,813,657 | Boothman | July 7, 1931 |
| 1,995,768 | Fesenmaier | Mar. 26, 1935 |
| 2,001,186 | Dornier | May 14, 1935 |
| 2,012,226 | Echlin | Aug. 20, 1935 |
| 2,191,631 | Shutes | Feb. 27, 1940 |
| 2,264,703 | Lenz | Dec. 2, 1941 |
| 2,268,369 | Askin | Dec. 30, 1941 |
| 2,317,457 | Heller | Apr. 27, 1943 |
| 2,332,368 | Burtenshaw | Oct. 19, 1943 |
| 2,337,584 | Baker | Dec. 28, 1943 |
| 2,343,402 | Clifford | Mar. 7, 1944 |
| 2,417,662 | Rosales | Mar. 18, 1947 |
| 2,433,546 | Cornelius | Dec. 30, 1947 |

FOREIGN PATENTS

| Number | Country | Date |
|---|---|---|
| 29,084 | Great Britain | 1911 |

OTHER REFERENCES

How to Weld Alum., "The Iron Age," June 20, 1946, pp. 52 and 53. (Copy in Div. 14.)